Jan. 7, 1936. K. STUART ET AL 2,027,296
BAKING UTENSIL
Filed Aug. 6, 1935
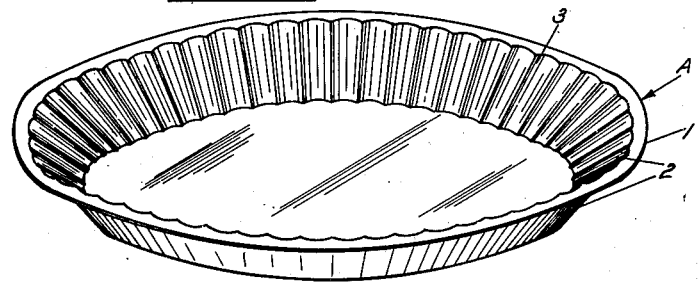
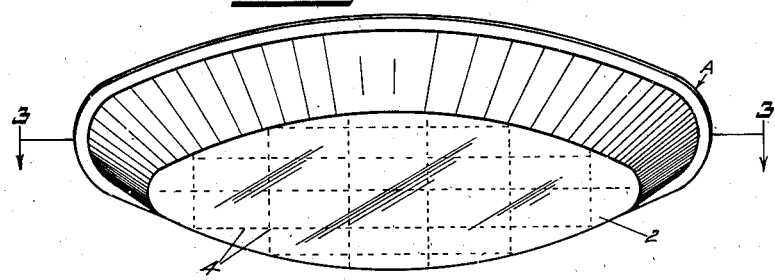
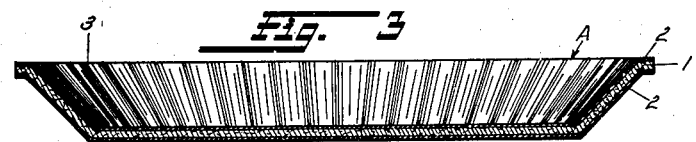
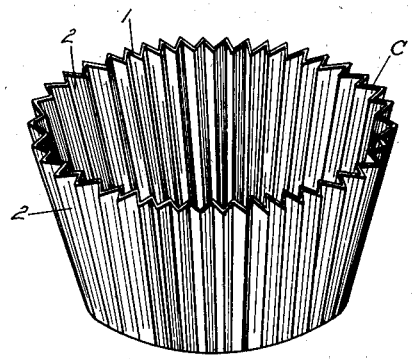
Inventor
Kimberly Stuart
Garrett B. Linderman Jr.
By Strauch & Hoffman
Attorneys Patented Jan. 7, 1936

2,027,296

UNITED STATES PATENT OFFICE 2,027,296

BAKING UTENSIL

Kimberly Stuart, Neenah, Wis., and Garrett B. Linderman, Jr., Beverly, N. J.

Application August 6, 1935, Serial No. 35,016

7 Claims. (Cl. 53—6)

Our invention relates to an improved cooking utensil, and more especially to a utensil for baking.

Heretofore in baking, as in baking bread, puddings, custards, cakes, and pies, it has been substantially universally customary to contain the article or ingredients to be baked in a plate or pan made from some suitable metal, though there has been suggested, and there are obtainable, earthenware and glass containers for cooking and baking purposes.

In baking and more especially in baking pies, baking pans, whether made of metal, earthenware or glass, are, we have discovered, open to serious objections which prevent the production of an entirely satisfactory product. In general the bottom crust is not of as good quality as the top crust. This is especially true of pies in which the filler is made up of juicy ingredients such as fruits. The juice seems to soak into the lower crust before it has baked sufficiently, thus usually making it very soggy. Moreover, in baking cakes we have found that when using pans made of metal it is difficult to obtain a properly browned outside crust without cooking the inside of the cake so much that it is somewhat dried out.

Now it is the primary object of our invention to provide a novel inexpensive baking utensil which may be utilized for containing the foods during the baking process, which is resistant to heat, which will not absorb moisture or grease and yet which will produce a properly baked product.

A further important object of our invention is to provide a baking utensil for containing the article during the baking process, which is resistant to heat, which will not absorb moisture or grease and yet which will produce a baked product having a bottom crust which is light, brown and flaky.

A further object of the invention is to devise novel materials for baking utensils.

A further object of our invention is to produce a cooking utensil at a minimum of expense, enabling its use but once, to which a pie for example will have no tendency to adhere, without the necessity of greasing, and one which may be utilized not only for the baking operation but also for delivery and storage of the product.

Further objects of our invention will become apparent as the specification proceeds in connection with the annexed drawing and from the appended claims.

We have found that when an article such as a pie or cake is baked in a container made of fibrous or other material which is a comparatively poor conductor of heat, and when metallic foil is interposed between the container and the article to be baked, the surface in contact with the metallic foil bakes much better than when baked under the same conditions in a solid metal container or a glass or earthenware container. The crust produced in our cooking utensil browns beautifully without burning, and is much more light and flaky than when baked in the types of containers now in use. This is the essential feature of our invention, and we will now proceed to explain in detail how we put it into practice.

In the drawing:

Figure 1 is a perspective view of a pan embodying our invention and which is used for pie baking purposes.

Figure 2 is a perspective view of the pan of Figure 1 showing the under side.

Figure 3 is a cross-sectional view taken on the line 3—3 of Figure 2, looking in the direction of the arrows.

Figure 4 is a view similar to Figure 3, but illustrates another form of pan embodying our invention, and Figure 5 is a perspective view of another form of cooking receptacle embodying our invention.

With continued reference to the drawing, wherein like reference characters have been employed to designate like parts throughout the several views thereof, in Figure 1 a plate or pan is indicated at A, which is preferably pressed from a circular blank of fibrous material 1, such as a heavy craft paper, on both sides of which has been cemented a coating of metallic foil 2, the fibrous material serving as a backing for the thin foil surfaces. In the drawing the thickness of the paper and foil sheets has been exaggerated for the purpose of clarifying the showing. The fibrous material is only visible at the edges because it is completely covered on both sides with metallic foil 2. We preferably scallop the edge of the pan as at 3, so that the fibrous material will not have to be stretched so much that it will rupture the foil coating when the blank is pressed into the shape of a pan. It is to be understood, however, that many forms of pans may be made without scalloping the edges, and the invention is therefore not limited to pans with scalloped edges.

The bottom of the pie pan is preferably provided with small perforations 4 on the bottom only, as seen in Figure 2. These perforations are for the purpose of allowing the escape of moisture which may be contained in the fibrous backing, during the baking operation. In some instances, when an imperforate bottom foil sheet has been used we have found that the foil will blister and separate from the fibrous backing.

The upper sheet of foil is preferably imperforate because the moisture may readily escape through the bottom foil sheet and also, if the upper foil sheet were perforate, grease or fruit juices would possibly soak into the fibrous backing. Another reason for perforating the lower, rather than the upper foil sheet resides in the fact that there is no chance for the food product to come into contact with the adhesive employed to hold the laminations together.

Figure 4 shows another form of the invention. In this form we use metallic foil 2 only on the inside of the pan B. In this case the fibrous material is preferably treated chemically so as to resist the heat of baking without charring. The treatment described by Herting in his Patents Nos. 1,699,843 issued January 22, 1929, and 1,804,417, issued May 12, 1931, can be used for this purpose and we have also found that when fire clay is incorporated in the fibrous material during its manufacture it will withstand baking temperatures without the necessity of any other treatment. In this form of the invention it is not necessary to perforate the foil, because any moisture present can escape through the bottom, where there is no foil coating.

The principal reason for using foil on the inner surface only is to save the cost of the coating on the bottom. In this way baking and cooking utensils can be made considerably cheaper than when foil is used on both surfaces, without impairing the baking and cooking properties thereof. This type of utensil, however, will not stand washing as well as the type with foil on both surfaces, and it generally can be used only once. Moreover, this type of utensil does not possess the sales appeal of the type with foil on both sides, and therefore if the article is to be marketed in the utensil, it is preferable to use the one shown in Figures 1 and 2.

In Figure 5 there is illustrated a utensil C of modified form, and which comprises a fibrous body 1 and foil sheets 2 secured to both sides thereof. It is to be understood, however, that if desired only one side of the fibrous body may be coated with foil, as in Figure 4. This utensil is adapted to the baking of deep cakes or cup cakes and gives a greatly superior product over that obtained by the utensils now in use.

By reason of the impervious character of the foil sheets, and the waterproof adhesive employed to hold them together, the utensils (made with foil on both sides) may be washed with soap and water without damaging them in any way.

The preferred methods of manufacturing the various utensils shown will now be disclosed.

The metallic foil may be of any desired character, but we find aluminum foil to be particularly desirable as it has a high heat conductivity and may be obtained at comparatively low cost in continuous sheets which are free from surface imperfections. The foil may be of any suitable thickness, but it is preferably approximately four ten-thousandths of an inch thick. It is to be understood, however, that the foil may be thicker or thinner, depending upon the nature of the receptacle involved and the results desired.

The fibrous material may assume various forms but heavy craft paper or its equivalent is preferably employed.

Any suitable adhesive may be employed to secure the laminations together, but we preferably use a latex adhesive made as follows, and which has proved entirely satisfactory for the purpose as it is heat-resistant and water-proof.

Plymax (modified casein that is soluble in water) is dissolved in lime and $CaF$ preferably according to the following procedure. 18.8 parts lime and 10 parts $CaF$ are mixed to a uniform suspension in 275 parts water and 100 parts "Plymax" added to the mixture with constant agitation. Stirring should be continued for at least 15 minutes and then the batch set aside for 15 minutes longer. 275 parts water then added to this followed by another period of agitation of 15 minutes. The character of the adhesive can be varied considerably by the additions of latex (45%). The range of addition is from 100 to 250 parts. The mixture with 175 parts latex is especially suited as a water proof adhesive and as an adhesive to withstand extreme temperatures. In the upper range of latex addition, it is advisable to add Neozone L as an anti-oxidant in the ratio of 3 parts.

The material (whether it consist of one or two foil sheets and a fibrous sheet) may be laminated in any suitable manner, but we preferably coat the paper and/or the foil with the fluid adhesive and then substantially immediately pass the laminations between a pair of rollers under pressure, preferably at room temperature, to effect an intimate bond between the laminations. This may be conveniently carried out on a production scale by feeding the various laminations from rolls into a machine wherein the adhesive is applied to the laminations and then immediately passed through the pressure or "marrying" rolls in a continuous operation. It has been found that although substantially no time elapses between the application of the adhesive and the application of pressure to the sheets between the marrying rollers, and the adhesive embodies a considerable quantity of water, the adhesive nevertheless sets into a dry, flexible mass and the fibrous body remains dry even when two layers of metal foil are used. It is believed that this may possibly be due to a catalytic action set up by the foil, which brings about a polymerization of the adhesive.

The various utensils disclosed are formed from the laminated material just described in any suitable manner. It is not necessary to allow the laminated material to stand until the adhesive has thoroughly set or dried, which with the adhesive disclosed usually requires several days. Blanks of the proper size may be cut from the material on or after the day the material has been laminated and then pressed into proper shape in cold or slightly heated forms or dies. It is not necessary to form the utensils singly as several may be formed in the same operation.

The perforations in the bottom foil sheet of the preferred form of the invention are more conveniently put in during the laminating of the stock by small wheels with many points on them rolling against the side of the stock which is to form the bottom of the utensil as it comes off the marrying rollers in finshed condition. It is essential that when stock with foil on both sides is being formed, the die be used cold or only slightly heated. Otherwise, the sudden heat will vaporize any residual moisture in the fibrous backing faster than it can escape through the small perforations and cause the foil to blister and separate from the fibrous backing. It is not necessary to perforate the foil on the bottom side before the pan is formed as we have found that this can be successfully done after the pan has been formed. It is, however, more convenient to do it at the time the stock is laminated. Moreover, in making the utensils with foil on both top and bottom we have found that it is not necessary to treat the fibrous material chemically to withstand the heat used in baking. In most cases the metallic foil coating amply protects it. However, for some purposes we prefer to treat the fibrous material chemically as described above, before laminating, and the appended claims are accordingly intended to embrace the invention irrespective of the nature of the fibrous sheet.

We have also found that it is generally necessary, especially when forming comparatively deep pans, or when very thin foil is used, to scallop the sides in such a way that the blank can be made to take the desired shape without undue compression or stretch. Too much compression or stretch of the laminated blank causes the foil to rupture and thus results in an imperfect product.

Aluminum is preferably used for the foil coating because it is strong enough to be easily manipulated, it has a beautiful silver color and produces excellent results on the article cooked. However there are a number of other metals that can be used, such as copper and tin, and the invention is accordingly not limited to aluminum foil.

We have found our utensils particularly adapted to the baking of such things as pies, tarts, cakes, custards and fruits, and in general it is useful in baking anything that has a crust on the bottom or sides where it comes in contact with the container and which should be baked brown and flaky.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A laminated, unitary self-sustaining baking utensil capable of withstanding baking temperatures, comprising an inner layer of heat-resistant metallic foil secured in substantially full surface engagement to an outer layer of heat-resistant fibrous material by means of a heat-resistant adhesive.

2. The baking utensil defined in claim 1, wherein said outer layer comprises craft paper impregnated with fire clay.

3. A laminated, unitary, self-sustaining baking utensil capable of withstanding baking temperatures, comprising an outer layer and an inner layer of heat-resistant metallic foil secured in substantially full surface engagement to a central layer of fibrous material by means of a heat-resistant adhesive, said utensil being self-supporting and comparatively rigid even when containing food products.

4. The baking utensil described in claim 3, wherein said heat-resistant adhesive contains a volatile ingredient, and wherein at least one of said layers of metallic foil is provided with apertures for permitting said ingredient to escape in response to heat.

5. A self-sustaining, laminated baking utensil capable of withstanding baking temperatures comprising an inner layer of aluminum foil, an outer layer of aluminum foil and a central layer of fibrous material disposed in superposed relationship; and means for rigidly securing said layers together in substantially full surface engagement comprising a heat-resistant adhesive having a volatile ingredient, at least one of said layers of aluminum foil having a plurality of perforations therein for permitting said volatile ingredient to escape when said utensil is heated.

6. The baking utensil described in claim 5, wherein said outer layer of aluminum foil is perforated.

7. A self-sustaining, laminated baking utensil capable of withstanding baking temperatures comprising an inner layer of aluminum foil, an outer layer of aluminum foil and a central layer of fibrous material disposed in superposed relationship; and a heat-resistant adhesive containing latex for rigidly securing said layers together in substantially full surface engagement, at least one of said layers of aluminum foil having a plurality of perforations therein for permitting volatile constituents of said fibrous material and said adhesive to escape when said utensil is heated.

GARRETT B. LINDERMAN, Jr.
KIMBERLY STUART.